United States Patent
Blonde et al.

(10) Patent No.: US 10,116,867 B2
(45) Date of Patent: Oct. 30, 2018

(54) METHOD AND APPARATUS FOR DISPLAYING A LIGHT FIELD BASED IMAGE ON A USER'S DEVICE, AND CORRESPONDING COMPUTER PROGRAM PRODUCT

(71) Applicant: THOMSON LICENSING, Issy les Moulineaux (FR)

(72) Inventors: Laurent Blonde, Thorigne-Fouillard (FR); Benoit Vandame, Betton (FR); Paul Kerbiriou, Thorigne-Fouillard (FR)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 15/167,921

(22) Filed: May 27, 2016

(65) Prior Publication Data

US 2016/0353026 A1   Dec. 1, 2016

(30) Foreign Application Priority Data

May 29, 2015   (EP) .................................... 15305825

(51) Int. Cl.
*H04N 5/232* (2006.01)
*H04N 1/00* (2006.01)
*G06T 7/00* (2017.01)
*H04N 5/225* (2006.01)

(52) U.S. Cl.
CPC ....... *H04N 5/23258* (2013.01); *G06T 7/0002* (2013.01); *H04N 1/00458* (2013.01); *H04N 5/225* (2013.01); *H04N 5/23212* (2013.01); *H04N 5/23229* (2013.01); *H04N 5/23293* (2013.01)

(58) Field of Classification Search
CPC .............. H04N 5/23258; H04N 5/225; H04N 5/23229; H04N 5/23293; H04N 5/23212; G06T 7/0002; G06T 2207/10052
See application file for complete search history.

(56) References Cited

U.S. PATENT DOCUMENTS 6,198,852 B1   3/2001  Anandan et al.
2006/0182433 A1*  8/2006  Kawahara ................ G03B 3/10
                                                        396/123

(Continued)

FOREIGN PATENT DOCUMENTS

EP    1071045    1/2001
EP    1785941    3/2011

(Continued)

OTHER PUBLICATIONS

Levoy, M., "Light fields and computational imaging", Computer, vol. 39, No. 8, Aug. 2006, pp. 46-55.

(Continued)

*Primary Examiner* — Shahbaz Nazrul
(74) *Attorney, Agent, or Firm* — Myers Wolin LLC (57) ABSTRACT

A method for displaying at least one light field based image on a user's device is disclosed. Such a method comprises displaying the image focused according to at least one focusing parameter determined as a function of a pose of the user's device. A sensor embedded in the users' device, which may be a handheld device, may estimate the pose.

9 Claims, 5 Drawing Sheets

(56) References Cited

U.S. PATENT DOCUMENTS

| | | | | |
|---|---|---|---|---|
| 2008/0131019 A1* | 6/2008 | Ng | ............................ | G06T 5/50 382/255 |
| 2009/0295829 A1* | 12/2009 | Georgiev | ............... | G03B 15/00 345/620 |
| 2010/0026852 A1* | 2/2010 | Ng | ....................... | G02B 3/0056 348/239 |
| 2010/0141802 A1* | 6/2010 | Knight | ............... | H04N 5/23212 348/240.3 |
| 2011/0273466 A1* | 11/2011 | Imai | ........................ | G09G 3/20 345/589 |
| 2012/0249797 A1 | 10/2012 | Haddick et al. | | |
| 2012/0257065 A1 | 10/2012 | Velarde et al. | | |
| 2013/0076966 A1 | 3/2013 | Border et al. | | |
| 2013/0222633 A1 | 8/2013 | Knight et al. | | |
| 2013/0329125 A1* | 12/2013 | Hamano | ............ | H04N 5/23212 348/349 |
| 2014/0098191 A1* | 4/2014 | Rime | ................... | H04N 5/2254 348/46 |
| 2014/0129988 A1* | 5/2014 | Liang | ................. | G06F 3/04815 715/838 |
| 2014/0177905 A1 | 6/2014 | Grefalda et al. | | |
| 2014/0198240 A1 | 7/2014 | Rhoads | | |
| 2014/0240463 A1* | 8/2014 | Pitts | ................... | H04N 5/23212 348/46 |
| 2015/0256764 A1* | 9/2015 | Besson | ................ | H04N 5/2628 348/50 |
| 2016/0246817 A1* | 8/2016 | Brune | ................ | H04N 13/0282 |
| 2016/0261801 A1* | 9/2016 | Horikawa | .......... | H04N 5/23287 |
| 2017/0091906 A1* | 3/2017 | Liang | ...................... | G06T 5/002 |
| 2017/0134639 A1* | 5/2017 | Pitts | ................... | H04N 5/23212 |

FOREIGN PATENT DOCUMENTS

| | | |
|---|---|---|
| EP | 2403234 | 1/2012 |
| EP | 2244484 | 3/2012 |
| FR | 2796797 | 1/2001 |
| GB | 2488905 | 9/2012 |
| WO | WO2012054231 | 4/2012 |
| WO | WO2014149403 | 9/2014 |

OTHER PUBLICATIONS

Ng et al., "Light Field Photography with a Hand-held Plenoptic Camera", Stanford Technical Report CSTR #2, Apr. 2005, pp. 1-11.

Sabater et al., "Accurate Disparity Estimation for Plenoptic Images", International Conference on Computational Photography, Santa Clara, California, USA, May 2, 2014, pp. 1-12.

Li et al., "Saliency Detection on Light Field", IEEE Conference on Computer Vision and Pattern Recognition, Columbus, Ohio, USA, Jun. 24, 2014, pp. 1-8.

Wanner et al: "Generating EPI Representations of 4D Light Fields with a Single Lens Focused Plenoptic Camera" published in ISVC 2011 Proceedings of the 7th International Conference on Advances in Visual Computing—vol. Part I, pp. 90-101, Las Vegas, NV, Sep. 26-28, 2011.

* cited by examiner

METHOD AND APPARATUS FOR DISPLAYING A LIGHT FIELD BASED IMAGE ON A USER'S DEVICE, AND CORRESPONDING COMPUTER PROGRAM PRODUCT

This application claims the benefit, under 35 U.S.C. § 119 of European Patent Application No. 15305825.0, filed May 29, 2015.

1. FIELD

The present disclosure relates to light-field imaging, and to technologies for acquiring and processing light-field data. More precisely, the present disclosure generally relates to a method and an apparatus for displaying a light field based image on a user's device, and finds applications in the domain of image or video rendering.

2. BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, it should be understood that these statements are to be read in this light, and not as admission of prior art.

Conventional image capture devices project a three-dimensional scene onto a two-dimensional sensor. During operation, a conventional capture device captures a two-dimensional (2-D) image of the scene representing an amount of light that reaches a photosensor (or photodetector) within the device. However, this 2-D image contains no information about the directional distribution of the light rays that reach the photosensor (which may be referred to as the light-field). Direction of incoming light, for example, is lost during such 2D acquisition and information like depth cannot be recovered for a single system. Thus, a conventional capture device does not store most of the information about the light distribution from the scene.

Light-field capture devices (also referred to as "light-field data acquisition devices") have been designed to measure a four-dimensional (4D) light-field of the scene by capturing the light from different viewpoints of that scene. Thus, by measuring the amount of light traveling along each beam of light that intersects the photosensor, these devices can capture additional optical information (information about the directional distribution of the bundle of light rays) for providing new imaging applications by post-processing. The information acquired/obtained by a light-field capture device is referred to as the light-field data. Light-field capture devices are defined herein as any devices that are capable of capturing light-field data. There are several types of light-field capture devices, among which:
- plenoptic devices, which use a microlens array placed between the image sensor and the main lens, as described in document US 2013/0222633;
- a camera array.

The light field data may also be simulated with Computer Generated Imagery (CGI), from a series of 2-D images of a scene each taken from a different viewpoint by the use of a conventional handheld camera.

Light-field data processing comprises notably, but is not limited to, generating refocused images of a scene, generating perspective views of a scene, generating depth maps of a scene, generating extended depth of field (EDOF) images, generating stereoscopic images, and/or any combination of these.

Hence, among others, a 4D Light-Field (4DLF) allows computing various re-focused images with adjustable depth-of-field, focalization distances and viewing positions. However, user experience is often limited to simple rendering on TVs or monitors, 2D computers and mobile displays.

It would be interesting to allow a user to visualize a personalized view (according to a given point of view, a user dependent depth blur . . . ) from the multiple directions and depth of field images that can be computed from a light field based acquisition system.

To this end, some academic works have focused on re-focalization, or on changing viewpoint direction from a light field image, such as Marc Levoy in "*Light fields and computational imaging*" IEEE Computer 39, no. 8 (2006): 46-55, and Ng Ren, et al. in "*Light field photography with a hand-held plenoptic camera*" Computer Science Technical Report CSTR 2, no. 11 (2005).

Some camera manufacturers such as Lytro® or Raytrix® also offer solutions for personalizing the image displayed to the user.

According to these techniques, interaction between the user and the display is offered by means of mouse pointing or by touching a tactile screen. For example, the user may point to an object in the scene, and the image displayed to the user will, in turn, show the selected object in focus.

It would be desirable to provide a technique for displaying a light field image that would enhance the interaction between the user and the light field content over the prior art. Notably, it would be desirable to provide such a technique, which would enhance the interaction with the light field content by optimizing the generation and use of viewpoint and/or refocusing parameters representative of user navigation in the light field image or video content.

3. SUMMARY

In one embodiment, a method for displaying at least one light field based image on a user's device is provided. Such a method comprises displaying the image focused according to at least one focusing parameter determined as a function of a pose of the user's device.

By pose, it is meant here and throughout this document a combination of position and orientation relative to a reference system.

The present disclosure thus relies on a novel and inventive approach of user navigation in a light field based content, such as a light field based video. Actually, it allows transforming a light field image or video dataset to one viewpoint/refocus per user, depending on a pose of the user's device. By moving the user's device, the user drives the parameters of the viewpoint/refocus (such as, for example, the direction of the chief ray in space, the focus point and depth blur distances) in an active way. Interactions of the user with the user's device are transformed, or translated into viewpoint and/or refocusing parameters.

Hence the technique of the present disclosure allows a better user experience in visualizing a video light field dataset, since natural actions of the user with the user's device generate visual changes in the 4D to 2D re-projection or refocus of images on the user's device.

Such a technique can be extended to several users, each user driving a different viewpoint/refocus in a given video data set. It may also be extended to several viewpoints per user, for example to address stereo or multi-view displays. Actually, several viewpoints/refocus can be extracted from the light field knowing the multi-view display geometry. For example, for a stereo rendering, pose/orientation information from the device may define a central view, not generated, but replaced by the two views necessary for the stereoscopic display. Geometrical transforms are used defining the two stereoscopic views on the basis of the central view.

It must be noted that the light field dataset may be captured by a plurality of image capture devices (such as a camera array) or by a plenoptic image capture device. It may also be simulated with Computer Generated Imagery (CGI).

According to an embodiment of the present disclosure, the pose is estimated by using at least one sensing device embedded in the user's device. Hence, one or several sensors capture interactions of the user with the user's device, and the position and orientation of the user's device can easily be derived from information captured by the sensors.

According to an embodiment of the present disclosure, such a sensing device belongs to the group comprising:
  an Internal motion capture system;
  an Inertial Measurement Unit (IMU);
  a camera pointing at at least one reference element.

Inertial Measurement Units are devices consisting of a combination of accelerometers and gyroscopes, and may also comprise magnetometers. They provide acceleration, orientation, and gravitational forces measures that allow computing orientation (rotation) and relative or absolute position (translation) of the device.

Cameras may either be a front camera on the user's device, which is a camera filming the user, or a back camera, which is a camera filming the scene in front of the user. With a front camera, filming the user's face closely enough, it is possible to make some assumptions on the user's face geometry to compute the camera pose versus a coordinate system attached to the face. With a front camera, the sensor may also consist in an eye tracking system. A back camera may point at a reference pattern in the scene, such as an AR tag.

Such a sensing device may also be an external motion capture system, such as:
  a camera in the room estimating the pose and orientation, from an AR tag;
  cameras in the room estimating the pose and orientation, e.g. from stereoscopy or multiview;
  light sources and cameras estimating the pose and orientation from retroreflecting elements (also known as passive markers);
  and more generally, any kind of motion capture (mocap) technologies.

According to an embodiment of the present disclosure, the user's device is a handheld device, such as a tablet or a smartphone.

The user, watching a light field video on the tablet or phone screen, may easily move the tablet screen, or phone screen, to drive the view point and focus parameters of an image.

According to another embodiment of the present disclosure, the displayed image is a slice image determined as an intersection of a focal stack with an intersection plane depending on at least one pose parameter of said device.

Figure 1:
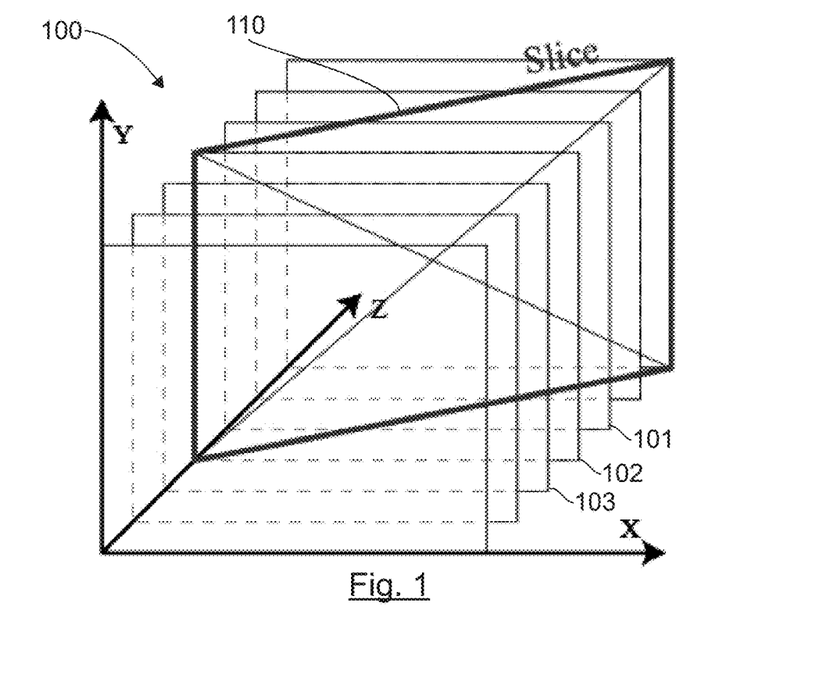
FIG. 1 is a diagram illustrating an example of a slice image within a focal stack of images.

Actually, dataset of a light field image or video can be reorganized to form a light data volume in the vicinity of the focal plane of a front lens similar to the light field generated by a lens in the vicinity of its focal plane. Such a focal stack is schematically illustrated in FIG. 1. A conventional focusing with a camera is simulated by selecting one of the images 101, 102, 103 within the focal stack 100, which corresponds to moving the focalization plane perpendicularly to the main optical axis of the camera. On the contrary, a light field camera offers the ability to explore pictures from different perspectives and different focal points. Thus, a user of the light field camera can control the focus in unusual way, for example, an intersection plane across the focal stack can be defined to extract a slice image 110 within the focal stack 100 as shown in FIG. 1. Embodiments of the present disclosure extend this principle to a user visualizing a light field image or video on the screen of his/her device, and allow driving an intersection plane in the focal stack image data volume by the tracked user's device pose parameters. The user's device position in space controls the focus distance of the resulting image displayed on the user's device screen.

According to a further embodiment of the present disclosure, the focal stack comprises a set of focused images of a scene, where two consecutive focused images are spaced a sampling interval apart from each other in the focal stack. The method also comprises:
  adjusting said sampling interval as a function of a layout of said scene;
  determining the focal stack as the set of consecutive focused images spaced an adjusted sampling interval apart from each other.

Hence, the different focused images of the scene are not regularly spaced in the focal stack, as was the case in the prior art. Instead of such a regular spacing, the focus of image samples in the focal stack is modulated by the layout of the scene. In other words, the planes at which the images of the focal stack are focused are not homogeneously spaced. For example, these planes are closer when an object of interest appears in the scene. This method allows to better cover the scene with the same number of slices in the focal stack, meaning that no extra storage is needed.

Embodiments of the present disclosure also concern an apparatus for displaying at least one light field based image, which comprises:
  a module for determining at least one focusing parameter for said image as a function of a pose of said apparatus;
  a display unit for displaying said image focused as a function of said at least one focusing parameter.

According to an embodiment of the present disclosure, such an apparatus embeds at least one sensing device allowing to estimate said pose. Such a sensing device may comprise several sensors.

According to an embodiment of the present disclosure, said sensing device belongs to the group comprising:
  an Inertial Measurement Unit (IMU);
  a camera pointing at at least one reference element;
  an Internal motion capture system.

According to another embodiment of the present disclosure, the apparatus is a handheld device.

According to another embodiment of the present disclosure, the apparatus comprises a unit for determining said displayed image as a slice image defined as an intersection of a focal stack with an intersection plane depending on at least one pose parameter of said device.

According to further embodiments of the present disclosure, the focal stack comprises a set of focused images of a scene, where two consecutive focused images are spaced a sampling interval apart from each other in the focal stack, and the apparatus also comprises:

an adjusting module for adjusting said sampling interval as a function of a layout of said scene;

a module for determining the focal stack as the set of consecutive focused images spaced an adjusted sampling interval apart from each other.

All features of the description of the user's device described above in relation to embodiments of the method for displaying a light field based image on a user's device also apply to such a user's device or apparatus.

The present disclosure also concerns a computer program product downloadable from a communication network and/or recorded on a medium readable by a computer and/or executable by a processor, comprising program code instructions for implementing a method for displaying a light field based image on a user's device as described above.

The present disclosure also concerns a non-transitory computer-readable medium comprising a computer program product recorded thereon and capable of being run by a processor, including program code instructions for implementing a method for displaying a light field based image on a user's device as described above.

Such a computer program may be stored on a computer readable storage medium. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

It is to be understood that both the foregoing general description and the following detailed description are exemplary and explanatory and are not restrictive of the invention, as claimed.

It must also be understood that references in the specification to "one embodiment" or "an embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

4. BRIEF DESCRIPTION OF THE DRAWINGS

Embodiments of the invention can be better understood with reference to the following description and drawings, given by way of example and not limiting the scope of protection, and in which.

The components in the figures are not necessarily to scale, emphasis instead being placed upon illustrating the principles of the invention.

5. DETAILED DESCRIPTION

The general principle of the present disclosure relies on a personalized rendering of a light-field based image on a user's device, depending on the position and orientation of the device.

A description will now be given of a method, an apparatus and a computer-readable storage medium for displaying a light field based image on a user's device in embodiments of the present disclosure.

We first recall some general principles applying to light field cameras and images.

5.1 Light Field Cameras

Figure 2A:
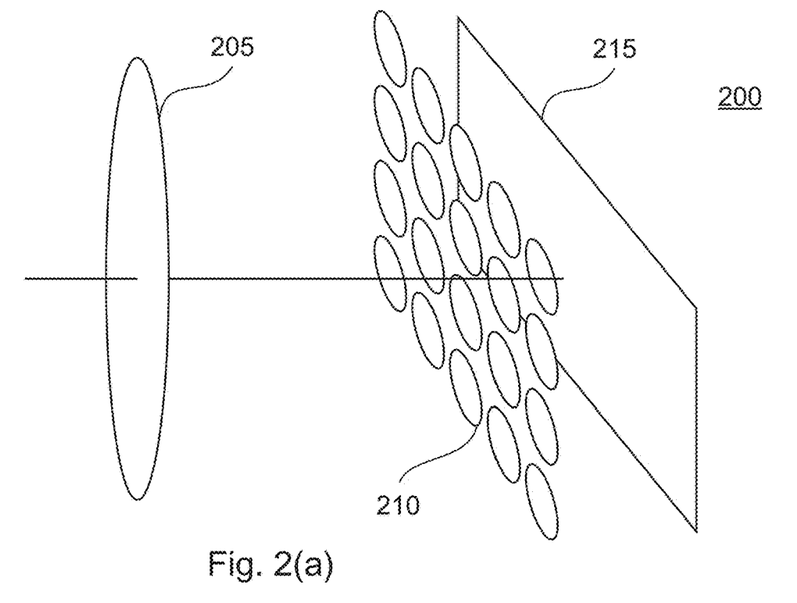
FIG. 2A is a diagram illustrating a plenoptic camera.
Figure 2B:
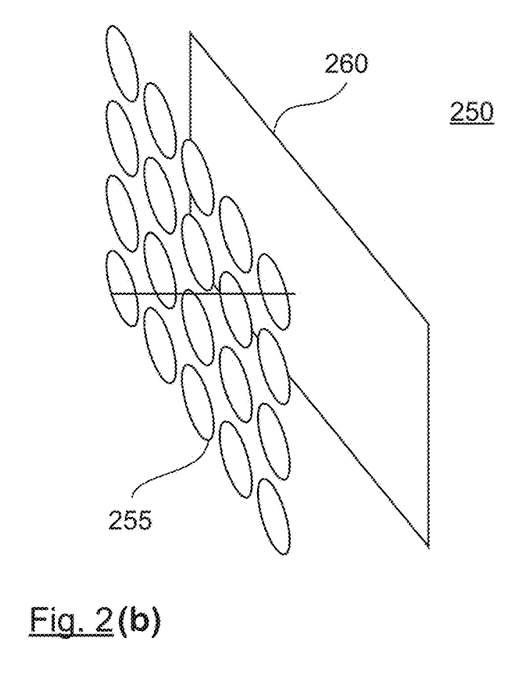
FIG. 2B is a diagram illustrating a multi-array camera.

FIGS. 2A and 2B illustrate examples of a plenoptic camera and a multi-array camera. Light-field cameras are capable of recording 4D light-field data. For instance, 4D light-field cameras may be: a plenoptic camera 200 comprising a main lens 205, a microlens array 210 and an image sensor 215 (FIG. 2A); or a multi-array camera 250 comprising a lens array 255 and a single image sensor 260 (FIG. 2B). For example, a multi-camera array can be a Pelican array camera as the one depicted in the document WO 2014149403 A1.

In the example of the plenoptic camera 200 as shown in FIG. 2A, the main lens 205 receives light from an object (not shown) in an object field of the main lens 205 and passes the light through an image field of the main lens 205. The microlens array 210 includes a plurality of microlenses 215 arranged in a two-dimensional array. Obviously, a main lens 205 and microlenses 215 can be more complex optical systems as the ones depicted for example in FIGS. 12 and 13 of document GB2488905 or document EP2244484 (A1).

Figure 3:
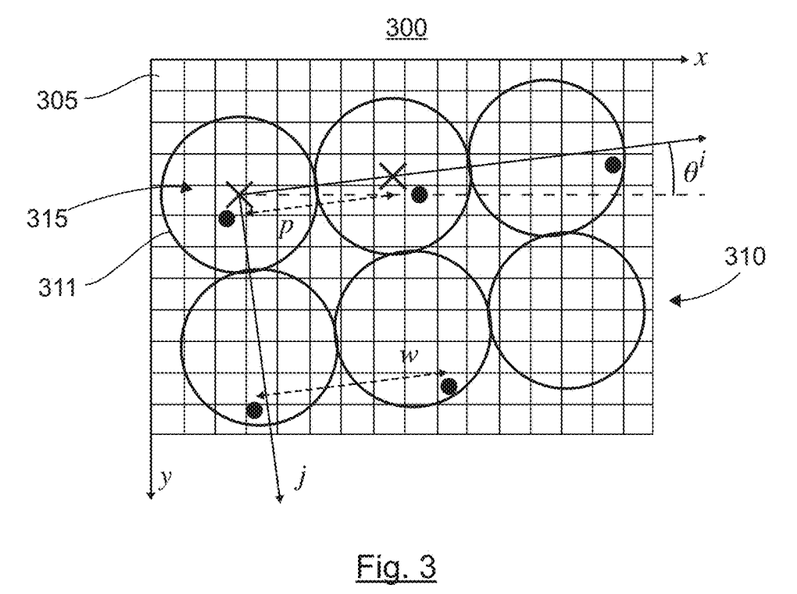
FIG. 3 shows a plan view schematically illustrating an example of sensor regions arranged on the sensing surface of the image sensor.

FIG. 3 is a plan view schematically illustrating an example of sensor regions arranged on the sensing surface of the image sensor. As illustrated in FIG. 3, the image sensor 300 includes a plurality of pixels 305 arranged in a two-dimensional array, and receives the light from the object through the microlens array 310. Each of the microlenses 311 of the microlens array 310 has the lens properties to direct the light to a circular area 315 on the image sensor 300. An outer contour of the circular area 315 may represent the shape of a micro-image formed and captured by a microlens on the image sensor 300, which shape depends on the shape of the microlens 311. Amongst all of the pixels 305 on the image sensor 300, only the pixels 305 located substantially inside the circular area 315 contribute to the imaging. In other words, a pixel area (or sensing area) of pixels 305 that contributes to the imaging is located substantially inside the circular area 315.

The image sensor 300 of light-field camera records an image comprising a collection of 2D micro-images arranged within a 2D image. Each microlens 311 of the microlens array 310 forms a micro-image represented by a circular area 315. Coordinates of pixels 305 on the sensor 300 is indicated by (x, y) in the x-y coordinate system on the surface of the image sensor 300 as shown in FIG. 3. The distance p shown in FIG. 3 is the distance between the two consecutive micro-images. Microlenses 311 are chosen such that the distance p is larger than the size of the pixel 305. The distance w shown in FIG. 3 is the disparity distance between the two consecutive micro-images. Micro-images are referred by their respective coordinate (i, j) in the i-j coordinate system on the surface of the image sensor 300 as shown in FIG. 3.

As mentioned above, only the pixels 305 located substantially inside the circular area 315 receive the light through the microlens 311. The inter microlens space may be masked out to prevent photons to pass outside a microlens 311 (if the microlenses 311 have a square shape and the inter microlens space is not formed, such a masking is not needed).

The center of a micro-image (i, j) is located on the image sensor 300 at the coordinate $(x_{i,j}, y_{i,j})$. The θ in FIG. 3 represents the angle between the square lattice of pixels 305 and the square lattice of microlenses 311. The coordinate $(x_{i,j}, y_{i,j})$ can be deduced by the following equation (1) considering $(x_{0,0}, y_{0,0})$ which is the pixel coordinate of the microlens image (0,0):

$$\begin{bmatrix} x_{i,j} \\ y_{i,j} \end{bmatrix} = p \begin{bmatrix} \cos\theta & -\sin\theta \\ \sin\theta & \cos\theta \end{bmatrix} \begin{bmatrix} i \\ j \end{bmatrix} + \begin{bmatrix} x_{0,0} \\ y_{0,0} \end{bmatrix} \quad (1)$$

The distances p and w are given in unit of pixel. They are converted into physical unit of distance (meters) P and W, respectively, by multiplying the pixel size δ: W=δw and P=δp. These distances depend on the characteristics of the light field camera.

5.2 Optical Properties of a Light Field Camera

Figure 4:
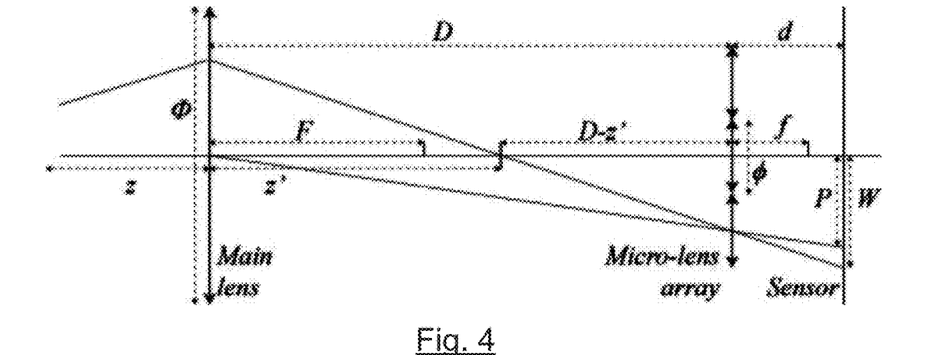
FIG. 4 illustrates a schematic light field camera comprising an ideal, perfect thin lens model.

Here, exemplary optical properties of a light field camera will be discussed with reference to FIG. 4, which illustrates a schematic light field camera comprising an ideal, perfect thin lens model.

The main lens has a focal length F and an aperture Φ. The microlens array comprises microlenses having a focal length f. The pitch of the microlens array is φ. The microlens array is located at a distance D from the main lens and at a distance d from the sensor. The object (not shown) is located at a distance z from the main lens. This object is focused by the main lens at a distance z' from the main lens. FIG. 4 illustrates the case where D>z'. In this case, micro-images can be in-focus on the sensor depending on d and f.

The disparity W varies with the distance z between the object (not shown) and the main lens. To establish the relation between W and z, it may rely on the thin lens equation (2) and the Thales law equation (3):

$$\frac{1}{z} + \frac{1}{z'} = \frac{1}{F} \quad (2)$$

$$\frac{D - z'}{\phi} = \frac{D - z' + d}{W} \quad (3)$$

Then, the following equation (4) is deduced by mixing the equations (2) and (3).

$$W = \phi \left( 1 + \frac{d}{D - \frac{zF}{z - F}} \right) \quad (4)$$

The relation between W and z are not on the assumption that the microlens images are in-focus. Micro-images are strictly in-focus according to the thin lens equation:

$$\frac{1}{D - z'} + \frac{1}{d} = \frac{1}{f} \quad (5)$$

5.3 Image Re-Focusing

A major property of the light-field camera is the possibility to compute 2D re-focused images where the re-focalization distance is freely adjustable after the shot of the images. The 4D light-field image L of size $[N_x, N_y]$ is projected into a 2D image by just shifting and zooming microlens images and then summing them into a 2D image. The amount of shift of the microlens images controls the re-focalization distance. The projection of the 4D light field pixel L(x, y, i, j) into the re-focused 2D image coordinate (X, Y) is defined by:

$$\begin{bmatrix} X \\ Y \end{bmatrix} = sg\left( \begin{bmatrix} x \\ y \end{bmatrix} - \begin{bmatrix} x_{i,j} \\ y_{i,j} \end{bmatrix} \right) + s \begin{bmatrix} x_{i,j} \\ y_{i,j} \end{bmatrix} \quad (6)$$

where s controls the size of the 2D re-focused image, and g controls the focalization distance of the re-focused image. This equation (6) can be rewritten as equation (7) by considering equation (1):

$$\begin{bmatrix} X \\ Y \end{bmatrix} = sg \begin{bmatrix} x \\ y \end{bmatrix} + sp(1-g) \begin{bmatrix} \cos\theta & -\sin\theta \\ \sin\theta & \cos\theta \end{bmatrix} \begin{bmatrix} i \\ j \end{bmatrix} + s(1-g) \begin{bmatrix} x_{0,0} \\ y_{0,0} \end{bmatrix} \quad (7)$$

The parameter g can be expressed as a function of p and w in equation (8). The parameter g represents the zoom that must be performed on the microlens images, using their centers as reference, such that the various zoomed views of the same objects get superimposed.

$$g = \frac{p}{p - w} \quad (8)$$

Equation (7) becomes:

$$\begin{bmatrix} X \\ Y \end{bmatrix} = sg \begin{bmatrix} x \\ y \end{bmatrix} - sgw \begin{bmatrix} \cos\theta & -\sin\theta \\ \sin\theta & \cos\theta \end{bmatrix} \begin{bmatrix} i \\ j \end{bmatrix} + \frac{sgw}{p} \begin{bmatrix} x_{0,0} \\ y_{0,0} \end{bmatrix} \quad (9)$$

The 4D light field pixels (x, y, i, j) are projected into the 2D refocused image. Preliminarily, a refocused image R and a refocused image weight $R_{weight}$ are set to 0. The size of the refocused images $[N_X, N_Y]=[sN_x, sN_y]$ is set to s times the size of the 4D light field image. The projection is performed by summing the projected pixels at the coordinate (X, Y) into the re-focused image. For each projected 4D light-field pixels, the refocused image weight is updated by adding 1 at the pixel coordinate (X, Y):

$$R(X,Y) += L(x,y,i,j)$$

$$W(X,Y) += 1 \quad (10)$$

The refocused image weight represents the number of 4D light field pixels that have been projected per coordinate (X, Y). After projecting all 4D light-field pixels of L, the refocused image R is divided by the refocused image weight $R_{weight}$. This last step normalizes the number of pixels received per coordinate (X, Y).

Since the projected coordinates (X, Y) are not necessarily integer coordinates, interpolation technique can be optionally used to map a non-integer pixel coordinate (X, Y) into the grid of the refocused image R and refocused image weight $R_{weight}$. Interpolation techniques are commonly used and are well known from the one skilled in the art; they will not be described further in the present specification.

5.4 Focal Stack

As illustrated in FIG. 1, focal stack 100 is a collection of N images $R_n$ (with $n \in [1, N]$), re-focused at different distances which define a cube of images (101, 102, 103 . . . ), where N is a user selected number of images. Hence, the distance or distance interval (on the z axis) between two consecutive images in the focal stack 100 corresponds to the distance between two focal planes linked to these two consecutive images. The N re-focused images are computed for g varying linearly between $g_{min}$ and $g_{max}$ corresponding to a range of focalization distances between $z_{min}$ and $z_{max}$ defined by equations (4) and (8). Another option is to compute the focal stack with w varying linearly from $w_{min}$ and $w_{max}$ corresponding to a range of focalization distances between $z_{min}$ and $z_{max}$ defined by equation (4). The min max boundaries of g or w are defined by the user in order to encompass re-focused images with a focalization distance within $z_{min}$ and $z_{max}$.

The computation of the focal stack described in this embodiment is on the assumption that a 4D light field is recorded by a single image sensor with a lens array and optionally a main lens. However, the computation of a focal stack is not limited to the 4D light field recorded by such type of light-field camera, therefore it should be noted that it is possible to compute a focal stack of re-focused images based on the 4D light field recorded by any types of light field cameras.

5.5 Refocusing Images according to the User Personalized Viewpoint

According to an embodiment of the present disclosure, an approach to adapt the light field image displayed one the user's device to the pose of the device is provided to the user.

Figure 5:
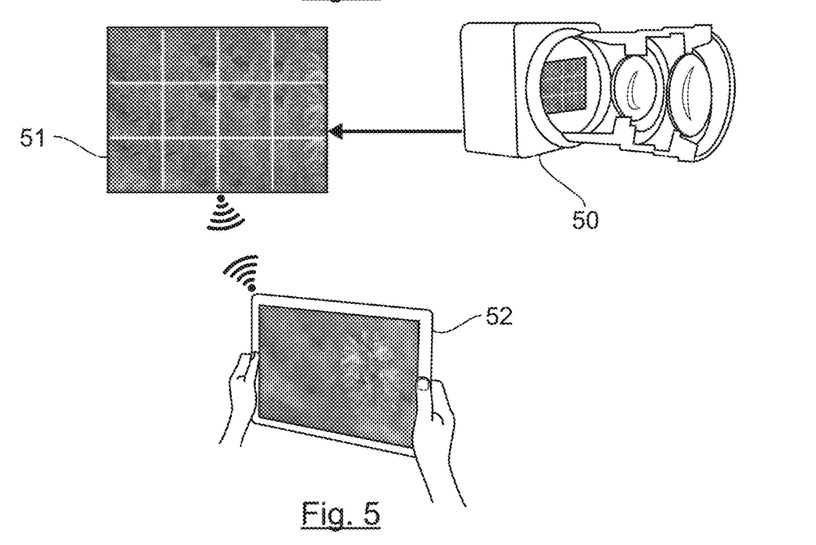
FIG. 5 schematically illustrates light-field rendering on a handheld device, according to an embodiment of the present disclosure.

FIG. 5 shows a plenoptic camera 50, which has captured 4D light-field data, which may correspond to an image or to a movie. In the state of the art, there are several ways to represent (or define) 4D light-field data. Indeed, in the Chapter 3.3 of the Phd dissertation thesis entitled "*Digital Light Field Photography*" by Ren Ng, published in July 2006, three different ways to represent 4D light-field data are described. Firstly, a 4D light-field data can be represented, when recorded by a plenoptic camera as the one depicted in FIG. 2(*a*) for example, by a collection of micro-lens images. 4D light-field data in this representation are named raw images (or raw 4D light-field data). Secondly, 4D light-field data can be represented, either when recorded by a plenoptic camera or by a camera array, by a set of sub-aperture images. A sub-aperture image corresponds to a captured image of a scene from a point of view, the point of view being slightly different between two sub-aperture images. These sub-aperture images give information about the parallax and depth of the imaged scene. Thirdly, 4D light-field data can be represented by a set of epipolar images (see for example the article entitled "*Generating EPI Representation of a 4D Light Fields with a Single Lens Focused Plenoptic Camera*", by S. Wanner et al., published in the conference proceedings of ISVC 2011). In another embodiment, one skilled in the art could use 4D light-field data based on a two planes parameterization.

In the embodiment of FIG. 5, as a mere example, the plenoptic capture 51 may be displayed as a matrix of views, or sub-aperture images.

A user views this 4D light-field movie on a handheld device, such as a tablet 52. Such a rendering may be a real-time rendering. The light-field movie may be broadcasted to several users, although only one is illustrated on FIG. 5. The tablet 52 receives the light-field movie through any kind of wired or wireless connection. The user may move the tablet 52, and hence modify both its position and its orientation. On the tablet's screen, both the focalization distance and the viewpoint of the images change with the tablet's pose.

Figure 6:
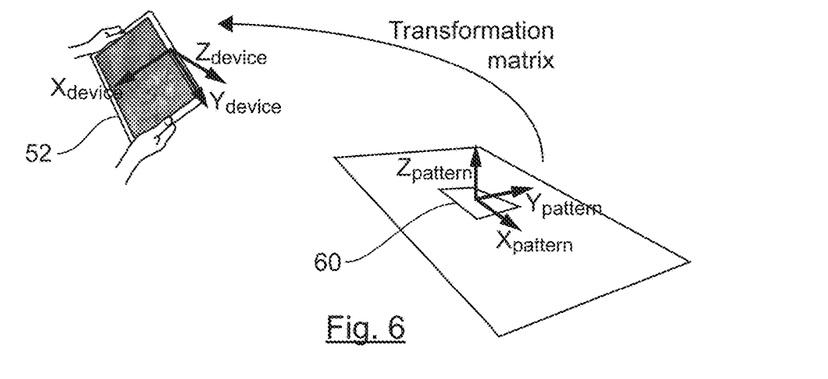
FIG. 6 illustrates the transformation matrix allowing determining the pose of the handheld device of FIG. 5 in a pattern coordinate system.

Tablet 52 is equipped with a back camera (not shown), which films the scene in front of the user, and notably a specific marker 60 (for example an AR tag (Augmented Reality tag)) inserted in the scene, as illustrated by FIG. 6. Marker 60 is associated with a Pattern Coordinate System. It is possible to locate tablet 52 in space, when the transformation describing the position of the tablet 52 from the pattern coordinate system has been found, since rotation and translation are provided.

To this end, the equation of the tablet plane must be expressed.

5.5.1 Tablet Plane Equation

To define the device coordinate system versus the pattern coordinate system we can write the unitary vectors of the device coordinate system and the translation of the device from the marker coordinate system.

$$\vec{X}_{device/pattern} = \begin{pmatrix} X_{X_{device}} \\ Y_{X_{device}} \\ Z_{X_{device}} \end{pmatrix}_{pattern}$$

$$\vec{Y}_{device/pattern} = \begin{pmatrix} X_{Y\_device} \\ Y_{Y\_device} \\ Z_{Y\_device} \end{pmatrix}_{pattern}$$

-continued $$\vec{Z}_{device/pattern} = \begin{pmatrix} X_{Z\_device} \\ Y_{Z\_device} \\ Z_{Z\_device} \end{pmatrix}_{pattern}$$

$$\vec{O}_{device/pattern} = \begin{pmatrix} X_{O\_device} \\ Y_{O\_device} \\ Z_{O\_device} \end{pmatrix}_{pattern}$$

Then the homogeneous transformation matrix describing the tablet Coordinate System (CS) viewed from the marker CS can be written as $$\vec{M}_{device/pattern} = \begin{bmatrix} \vec{X}_{device} & \vec{Y}_{device} & \vec{Z}_{devise} & \vec{O}_{devise} \\ 0 & 0 & 0 & 1 \end{bmatrix}_{pattern}$$

$$\vec{M}_{device/pattern} = \begin{bmatrix} X_{X_{device}} & X_{Y\_device} & X_{Z\_device} & X_{O\_device} \\ Y_{X_{device}} & Y_{Y\_device} & Y_{Z\_device} & Y_{O\_device} \\ Z_{X_{device}} & Z_{Y\_device} & Z_{Z\_device} & Z_{O\_device} \\ 0 & 0 & 0 & 1 \end{bmatrix}_{pattern}$$

Then the plane of the tablet is defined by the $\vec{Z}_{device/pattern}$ (normal vector to the plane) vector and by $\vec{O}_{device/pattern}$ (position of one point of the plane) point. The set of points P (Xp, Yp, Zp) of the plane is provided by the following equation:

$$\vec{OP}_{device} \cdot \vec{Z}_{device} = 0$$

That can be written with the following format:

$$(X_p - X_{0_{device}})X_{Z_{device}} + (Y_p - Y_{0_{device}})Y_{Z_{device}} + (Z_p - Z_{0_{device}})Z_{Z_{device}} = 0$$

As an alternative, coordinates can be evaluated in pixels ($X_p$, $Y_p$, $Z_p$).

To generate an image with pixel coordinates (u, v) we have to define transformations $$u \xrightarrow{yields} (X_p - X_{0_{device}}) \text{ and } v \xrightarrow{yields} (Y_p - Y_{0_{device}})$$

In one embodiment the transformations can be defined $$\text{with } \begin{cases} (X_p - X_{0_{device}}) = \dfrac{u - \dfrac{width_{image}}{2}}{width_{image}} \\ (Y_p - Y_{0_{device}}) = \dfrac{v - \dfrac{height_{image}}{2}}{height_{image}} \end{cases}$$

This corresponds to normalizing the (X, Y) space in the range [−½; +½]

It is then easy to determine $Z_p$, that is, the position of the pixel in the marker coordinate system:

$$Z_p = Z_{0_{device}} - \left( \dfrac{u - \dfrac{width_{image}}{2}}{width_{image}} \dfrac{X_{Z_{device}}}{Z_{Z_{device}}} + \dfrac{v - \dfrac{height_{image}}{2}}{height_{image}} \dfrac{Y_{Z_{device}}}{Z_{Z_{device}}} \right)$$

Note that this equation is equivalent to a projection.

5.5.2 Extracting the Slice Image from the Focal Stack

According to embodiments of the present disclosure, the image displayed on the tablet 52 is a slice image determined as an intersection of the focal stack 100 with an intersection plane controlled by the tracked tablet pose parameters. In other words, the position of the slice 110 within the focal stack 100 is given by the position of the tablet 52 relative to the marker 60. Moving the tablet around makes the slice move within the focal stack. The slice image 110 is displayed on the screen of the tablet 52. The user, by moving the tablet 52 around, can freely select a focalization plane, which is not necessarily perpendicular to the main-axis of the camera 50.

Figure 7:
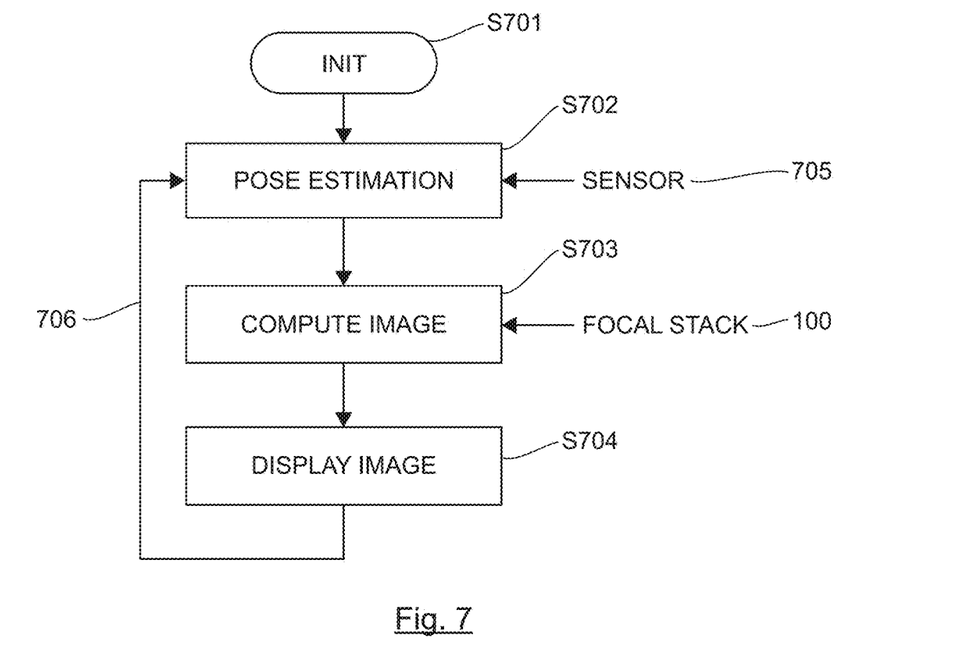
FIG. 7 is a flow chart for explaining a process for displaying a light-field based image on a user's device according to an embodiment of the present disclosure.

FIG. 7 shows a flow chart illustrating a process for displaying a light-field based image on tablet 52 according to an embodiment of the present disclosure.

At step S701 INIT, an initial position of the tablet ($X_{0_{device}}$, $Y_{0_{device}}$, $Z_{0_{device}}$) is defined and used as a reference, with reference to the marker 60. This initial position will be associated with the focused image number N/2 of the focal stack, i.e. the image corresponding to the middle image of the stack of images.

At step S702, information captured by sensors 705 allows estimating the pose of the tablet 52, i.e. its orientation and its position. The position of the tablet 52 versus the marker is characterized by the 3D coordinate ($X_{Z_{device}}$, $Y_{Z_{device}}$, $Z_{Z_{device}}$). Moving the tablet 52 around the initial tablet position ($X_{0_{device}}$, $Y_{0_{device}}$, $Z_{0_{device}}$) is associated to moving the slice of the focal stack.

Hence, at step S703, the image to be displayed on the tablet 52 is computed, as the slice image of focal stack 100, associated with the current tablet pose.

A slice index image $S_i$ having the size [$N_X$, $N_Y$] pixels (i.e. the same size as the focused images within the focal stack 100) is defined as:

$$S_i(X,Y) = N\alpha(X_{Z_{device}} - X_{0_{device}})(X/N_X - \tfrac{1}{2}) + N\alpha(Y_{Z_{device}} - Y_{0_{device}})(Y/N_Y - \tfrac{1}{2}) + N\beta(Z_{Z_{device}} - Z_{0_{device}}) + N/2$$

The slice image S has the size of [$N_X$, $N_Y$] pixels. It is computed with the slice index image $S_i$: $S(X,Y) = R_{S_i(X,Y)}(X,Y)$. Index $S_i$ in $R_{S_i}$ indicates which focused image inside the focal stack for each pixel (X, Y) is to be copied (function R) into the slice image S at the pixel (X, Y). The parameter α controls how fast the slice is slanted while the tablet is shifted around in the $X_{Z_{device}}$ and $Y_{Z_{device}}$ axis. The parameter β controls how much the slice is moving on the $Z_{Z_{device}}$ axis. These parameters are tuned such that any slice within the focal stack can be extracted without the need to move the tablet too much. A typical total excursion of 10 cm in $Z_{Z_{device}}$ (max of approximately 20 cm) should be mapped to the focal stack number of images N.

At step S704, the slice image S is displayed on the tablet 52. S is actualized for each new image obtained by the camera, and also for each new position of the tablet, as illustrated by arrow 706.

It must be noted that the same derivation can be made with pixel coordinates ($X_p$, $Y_p$, $Z_p$).

Figure 8:
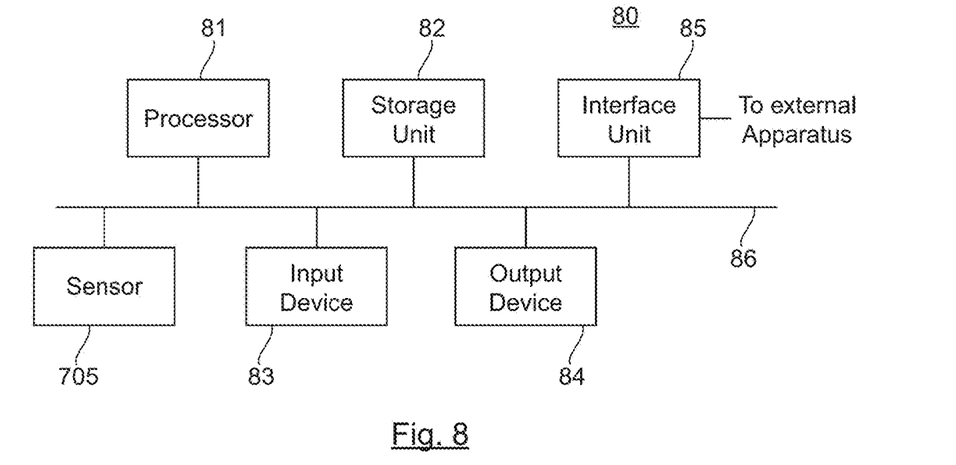
FIG. 8 is a schematic block diagram illustrating an example of an apparatus for displaying a light-field based image according to a user's personalized viewpoint according to an embodiment of the present disclosure.

FIG. 8 is a schematic block diagram illustrating an example of an apparatus for displaying a light field based image, in a way which is personalized depending on the apparatus position and orientation according to an embodiment of the present disclosure.

An apparatus 80 illustrated in FIG. 8 includes a processor 81, a storage unit 82, an input device 83, an output device 84, an interface unit 85 and a sensor 705 which are connected by a bus 86. Of course, constituent elements of the computer apparatus 80 may be connected by a connection other than a bus connection using the bus 86. Such an apparatus 80 is for example the tablet 52 of FIGS. 5 and 6, or any other type of handheld device, such as a smartphone.

The processor 81 controls operations of the apparatus 80. The storage unit 82 stores at least one program to be executed by the processor 81, and various data, including data of 4D light field images captured and provided by a light field camera, parameters used by computations performed by the processor 81, intermediate data of computations performed by the processor 81, information captured by sensor 705, and so on. The storage unit 82 may notably store the focal stack 100, as provided by a light field capture device. The processor 81 may be formed by any known and suitable hardware, or software, or a combination of hardware and software. For example, the processor 81 may be formed by dedicated hardware such as a processing circuit, or by a programmable processing unit such as a CPU (Central Processing Unit) that executes a program stored in a memory thereof.

The storage unit 82 may be formed by any suitable storage or means capable of storing the program, data, or the like in a computer-readable manner. Examples of the storage unit 82 include non-transitory computer-readable storage media such as semiconductor memory devices, and magnetic, optical, or magneto-optical recording media loaded into a read and write unit. The program causes the processor 81 to perform a process for displaying a light field image which focalization parameters are set in accordance with pose parameters of the apparatus according to an embodiment of the present disclosure as described above with reference to FIG. 7.

The input device 83 may be formed by a keyboard, a pointing device such as a mouse, or the like for use by the user to input commands. The output device 84 may be formed by a display device to display, for example, a Graphical User Interface (GUI), or the light field based image personalized to the user's viewpoint. The input device 83 and the output device 84 may be formed integrally by a touchscreen panel, for example.

The interface unit 85 provides an interface between the apparatus 80 and an external apparatus. The interface unit 85 may be communicable with the external apparatus via cable or wireless communication. In this embodiment, the external apparatus may be a light field camera. In this case, data of 4D light field images captured by the light field camera can be input from the light field camera to the apparatus 80 through the interface unit 85, then stored in the storage unit 82, and displayed on screen 84.

The apparatus 80 and the light field camera may communicate with each other via cable or wireless communication.

Although only one processor 81 is shown on FIG. 8, it must be understood that such a processor may comprise different modules and units embodying the functions carried out by apparatus 80 according to embodiments of the present disclosure, such as:
- a module for estimating a pose of the apparatus, on the basis of information provided by sensor 705;
- a module for determining focusing parameters for the image to be displayed, as a function of the estimated pose of the apparatus;
- a unit for computing the image to be displayed as a slice image of the focal stack, as a function of the focusing parameters and/or the pose parameters of the apparatus.

These modules and units may also be embodied in several processors 81 communicating and co-operating with each other.

5.6 Adapting the Focal Stack to the Layout of the Scene

Figure 9:
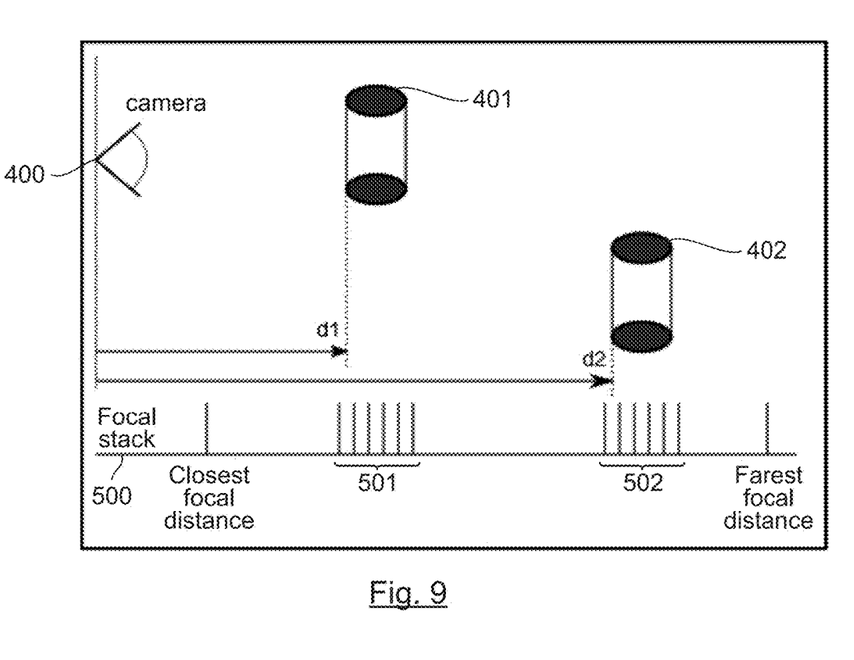
FIG. 9 schematically illustrates a scene with objects of interest, and the way the focal stack of images could be adapted to such a scene, according to an embodiment of the present disclosure.

FIG. 9 shows an example of a scene captured by a camera 400. Such a scene comprises two objects of interest 401 and 402. Object of interest 401 is located at a distance d1 from camera 400, while the other object of interest 402 is located at a distance d2 from camera 400.

When object of interest 401 or 402 is detected in the scene, its position (distance d1 or d2) is known, so focus value can be computed. It is then also possible to compute close focus values for this position. This is illustrated in FIG. 9, where, at distances d1 and d2, more images are computed for the focal stack. Focal stack 500 hence comprises a focused image corresponding to the closest focal distance, a focused image corresponding to the furthest focal distance, and in-between, two sets of focused images:
- a first group 501 of focused images associated to object of interest 401;
- a second group 502 of focused images associated to object of interest 402.

The computing of images located between objects of interest and the other planes (background or foreground for example) can be linearly driven by depth.

In a variant, the distance between two consecutive images (also named a step) in the focal stack is defined by default as being small (two consecutive images being associated with focal planes spaced each other from around 20 cm in the scene space). Then, a user can decide to select a zone which he/she is not interested in (for example objects positioned in the background), and a focal stack is determined by taking into account the fact that the objects in the background are not important (therefore, the distance between these images is increased compared to the default value in the determined focal stack).

Figure 10:
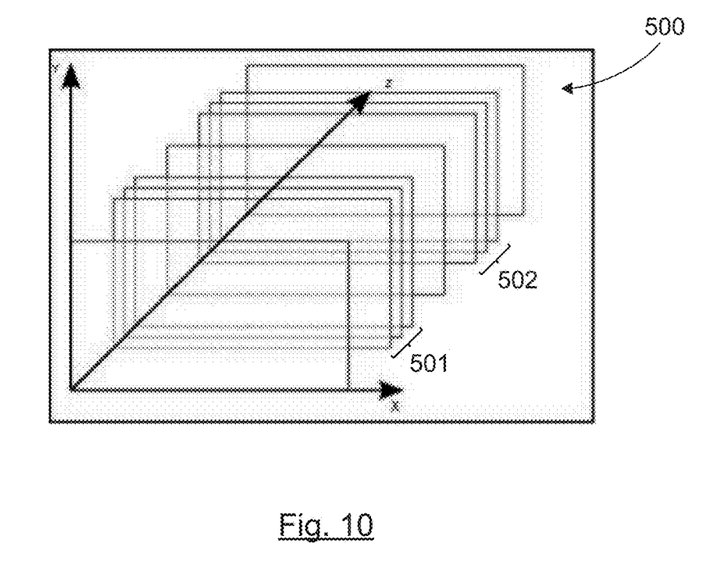
FIG. 10 is a diagram illustrating an example of a focal stack of images, which has been adapted to the scene of FIG. 9.

FIG. 10 illustrates the focal stack 500, which has been built with an irregular sampling grid adapted to the scene.

The number of focused images in the set 501 or 502 associated to object of interest 401 or 402 depends on the depth of the object of interest, where the depth corresponds to the distance from the front to the back of the object of interest (the front of the object corresponding to the part of the object which is the closest to the camera, and the back of the object corresponding to the part of the object which is the furthest from the camera). The deeper the object of interest, the more images in the corresponding set of focused images in the focal stack, allowing a finer rendering of the object of interest in an AIF image, or better refocusing capabilities of the scene.

Actually, thanks to the embodiment of FIGS. 9 and 10, more "in-focus regions" are attached to objects of interest. An AIF image corresponds to a focused image in which all objects appear in-focus, and is composed by focus fusion. For objects of interest, the quality of the DoF (Depth of Field) will hence increase in the AIF image.

Moreover, the number of slices of the focal stack associated to the object of interest is high, which will provide more information to the user, when he/she wants to refocus the scene on this peculiar object of interest, notably by moving around tablet 52 to adjust the displayed image to a peculiar focalization distance and/or viewpoint.

According to embodiments of the present disclosure, objects of interest 401 and 402 may be:
- a salient object (as described for example in "Saliency Detection on Light Field" by Nianyi Li, Jinwei Ye, Yu Ji, Haibin Ling, and Jingyi Yu);
- a face, or part or whole of a human body, detected in the scene;

a foreground object (identified for example via disparity estimation, as described in ICCP2014, "Accurate Disparity Estimation for Plenoptic Images" by N. Sabater, V. Drazic, M. Seifi, G. Sandri and P. Perez);

an object selected by a user (for example, an object manually selected by a user on a certain frame and tracked along a video sequence).

In the same scene, one or several objects of interest can be detected. The sampling grid for the focal stack will adapt to as many objects of interest as detected in the scene.

Of course, in the embodiment of FIGS. 9 and 10, the focal stack used by the apparatus 80 of FIG. 8 or used at step S703 in the process of FIG. 7, is the adapted focal stack 500 of FIG. 10, rather than the regular focal stack 100 of FIG. 1.

In this peculiar embodiment, processor 81 of apparatus 80 may further comprise a set of units and modules for embodying the functions of computing an adaptive focal stack as a function of the layout of the scene, and notably:

- an adjusting module for reducing or increasing the sampling interval according to the layout of the scene;
- a module for determining the focal stack as the set of consecutive focused images spaced an adjusted sampling interval apart from each other;
- a module for identifying objects of interest in the scene;
- a module for assessing the depth of objects of interest;
- a module for determining the number of focused images to be associated to each object of interest;
- a disparity estimation module for estimating disparities from the light field data set or from a matrix of views generated from the light field data set;
- a computing unit for computing the position of objects of interest in the scene from the estimated disparities.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "circuit", "module", or "system".

When the present principles are implemented by one or several hardware components, it can be noted that an hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas) which receive or transmit radio signals. In one embodiment, the hardware component is compliant with one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications and/or NFC (for Near Field) communications.

Furthermore, aspects of the present principles can take the form of a computer readable storage medium. Any combination of one or more computer readable storage medium(s) may be utilized.

Thus for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo code, and the like represent various processes which may be substantially represented in computer readable storage media and so executed by a computer or a processor, whether or not such computer or processor is explicitly shown.

Although the present disclosure has been described with reference to one or more examples, workers skilled in the art will recognize that changes may be made in form and detail without departing from the scope of the disclosure and/or the appended claims.

The invention claimed is:

1. A method for displaying at least one light field based image on a user's device, wherein the method comprises
    displaying said image focused according to at least one focusing parameter determined as a function of a movement of said device by a user,
    wherein said displayed image is a slice image determined as an intersection of a focal stack with an intersection plane depending on at least one movement parameter of said device
    wherein said focal stack comprises a set of focused images of a scene, where two consecutive focused images are spaced a sampling interval apart from each other in the focal stack, and wherein the method also comprises:
        adjusting said sampling interval as a function of a layout of said scene;
        determining the focal stack as the set of consecutive focused images spaced an adjusted sampling interval apart from each other.

2. The method of claim 1, wherein said movement is estimated by using at least one sensing device embedded in said user's device.

3. The method of claim 2, wherein said sensing device belongs to the group comprising:
    an Inertial Measurement Unit;
    a camera pointing at at least one reference element;
    an Internal motion capture system.

4. The method of claim 1, wherein said user's device is a handheld device.

5. An apparatus for displaying at least one light field based image, the apparatus comprising:
    a determiner for determining at least one focusing parameter for said image as a function of a movement of said apparatus;
    a displayer for displaying said image focused as a function of said at least one focusing parameter,
    wherein the apparatus comprises a unit for determining said displayed image as a slice image defined as an intersection of a focal stack with an intersection plane depending on at least one movement parameter of said device, and
    wherein said focal stack comprises a set of focused images of a scene, where two consecutive focused images are spaced a sampling interval apart from each other in the focal stack, and wherein the apparatus also comprises:

an adjuster for adjusting said sampling interval as a function of a layout of said scene;

a determiner for determining the focal stack as the set of consecutive focused images spaced an adjusted sampling interval apart from each other.

6. The apparatus of claim 5, wherein the apparatus embeds at least one sensing device allowing to estimate said movement.

7. The apparatus of claim 6, wherein said sensing device belongs to the group comprising:

an Inertial Measurement Unit;

a camera pointing at at least one reference element;

an Internal motion capture system.

8. The apparatus of claim 5, wherein the apparatus is a handheld device.

9. A non-transitory computer-readable medium comprising a computer program product recorded thereon and capable of being run by a processor, including program code instructions for implementing a method according to claim 1.

* * * * *